Oct. 13, 1936.                R. W. SMITH                2,057,066
        MEANS FOR BALANCING AND STRENGTHENING OF
          OCULAR MUSCLES AND DEVELOPING FUSION
                    Filed Aug. 16, 1934
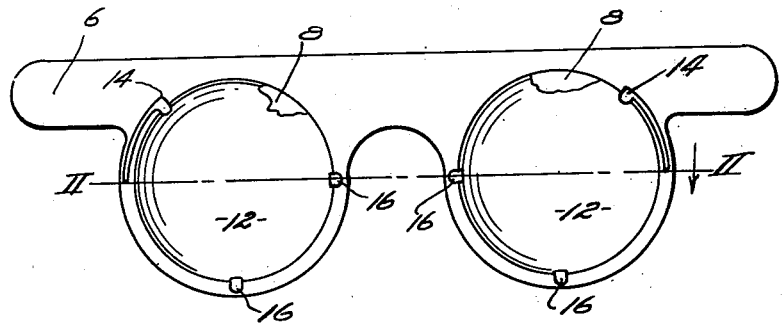
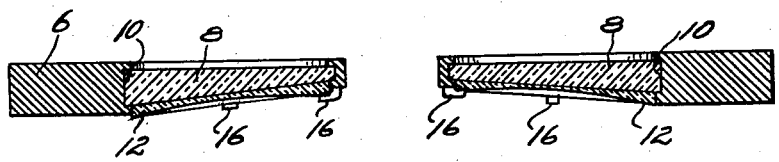
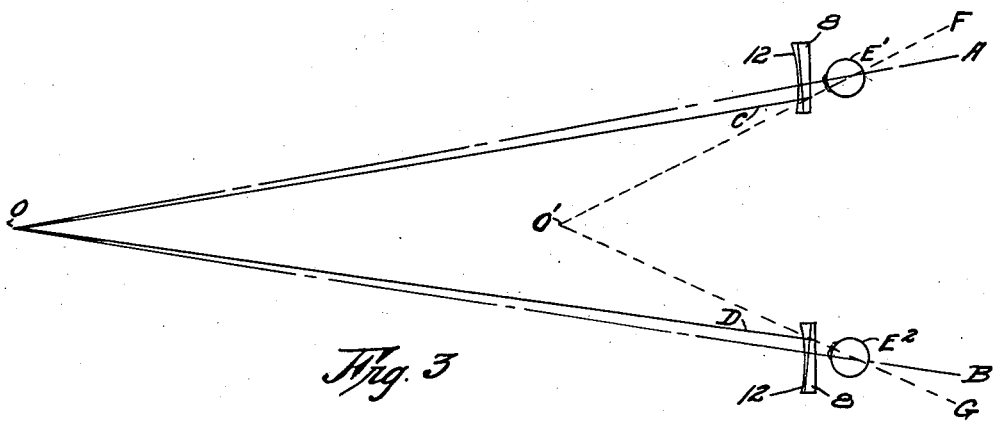
INVENTOR,
Robert W. Smith.
BY
                        ATTORNEYS.

Patented Oct. 13, 1936

2,057,066

UNITED STATES PATENT OFFICE 2,057,066

MEANS FOR BALANCING AND STRENGTHENING OF OCULAR MUSCLES AND DEVELOPING FUSION

Robert W. Smith, Kansas City, Mo.

Application August 16, 1934, Serial No. 740,069

1 Claim. (Cl. 88—20)

This invention relates to means for balancing and strengthening of ocular muscles and developing fusion in the human eye, and one of the primary aims is to provide in such a method a sequence of novel and unique steps which will result in accomplishing the ends in mind.

Another object of the invention is the provision of a specially made and unique instrument which is designed to train the eyes to fuse normally the two images seen when viewing an object and to develope weak ocular muscles to normal strength.

Another object of the invention is the provision of an optical instrument used in the aforesaid means which will train all the ocular muscles and the fusion faculties of the eyes to work in harmony and coordination.

A large number of minor objects of this invention will appear during the course of the following specification, referring to the accompanying drawing, wherein:

Figure 1 is a front view of an instrument made for use in the method contemplated and embodying the instant invention.

Fig. 2 is a longitudinal section through the instrument taken on line II—II of Fig. 1, and, Fig. 3 is a diagrammatical view illustrating the action of the instrument on the eyes.

It is well known in the profession that muscles of the eyes might be exercised and trained to function in a more perfect manner approaching the normal if suitable means are employed to concentrate the exercises in those muscles most commonly weak. This invention, including both the method and instrument, is intended to make the functions of the eyes normal whether the eyes being treated are in need of glasses or whether they are merely weak and require co-ordination and building up.

This invention is not intended to eliminate the use of glasses when the same are necessary or advisable, but is intended to eliminate the necessity of rest or accommodation relieving lenses in the pre-presbyopic ages and to preclude the fitting and use of accommodation replacing lenses before they are actually needed. The use of the method and instrument in accordance with the invention will also eliminate the fitting and wearing of stronger-than-needed accommodation replacing lenses within the presbyopic ages. It has also been discovered that the instrument embodying the features of the invention will balance and co-ordinate all the working functions of the two eyes and eliminate unnatural toxic accumulations. Obviously, the invention will not overcome normal toxic fatigue.

With respect to the instrument per se, the same may be exemplified in one as illustrated in the drawing and may comprise a holder 6 that is formed of any suitable material and made to support a pair of optical glass prisms 8 that are mounted with their bases 10 disposed outwardly toward the ends of holder 6 so that when viewing an object through these prisms, the eyes will be caused to converge as hereinafter set down.

In order to fulfill the accommodation feature, there is combined with each of prisms 8 a minus or plano-concave lens 12 which is removably associated with prisms 8 by a spring catch 14 in co-operation with a number of shoulders 16, all supported by holder 6. In describing the invention, as comprising separate lenses in the form of prisms 8 and lens 12, only the commercially desirable form is mentioned. It is understood that prisms 8 and associated lens 12 might be made of a single piece of optical glass. Holder 6 is formed so that the prisms and lenses might be brought into operative relation with the eyes and the instrument might be made any pupillary width. It is necessary to relate prisms 8 and lenses 12 so that the action of the lenses will be always to utilize that amount of accommodation necessary to focus the eyes at the same near point which the prisms establish.

As an example of a pupillary distance, let it be assumed that the same is 70 mm. This pupillary distance of 70 mm. requires 42 prism diopters to establish the equivalent of binocular fixation at 6⅔ inches from the eyes. A pupillary distance of 60 mm. requires but 36 prism diopters to give the same equivalent. In practice, the instrument can be made with prisms to give the equivalent of binocular fixation at any point such as 10, 12 and 15 inches from the eyes and the minus lens must be made to cause an accommodation to the same point that the prism is fixed for.

With a pupillary distance of 65 mm. requiring 39 prism diopters, there is used —6.00 diopter lenses. In using the instrument, an object O is viewed by eyes $E_1$ and $E_2$ at a distance of more than twenty feet and without the use of the instrument.

An instrument having a pupillary width of 65 mm. can be used for any other pupillary width when the minus lens is in place as a width of over 65 mm. receives the necessary increased base out prism to care for the increased convergence necessary, from the —6.00 diopter lens.

In other words, looking through the prisms to the outside of the optical centers thereof will bring into use the prismatic effect of decentered minus lenses to assure the increased convergence necessary to bring the accommodated focal point to 6⅔ inches from the eyes.

When the instrument is placed with prisms 8 and lenses 12 as shown in Fig. 2, the path of rays indicated by lines OA and OB is changed so that the path is described by line OC and OD. Placing of the instrument before the eyes will cause the axes of eyes $E_1$ and $E_2$ to change to converge at point $O_1$, which will cause an action in the eyes the same as though they were viewing the object O at the near point $O_1$ without the instrument. The axes of eyes $E_1$ and $E_2$, therefore, will be along lines $O_1$—F and $O_1$—G.

The eyes will first converge and fuse and then accommodation will take place because of the minus lens 12. The internal recti and ciliary muscles of the eyes that are brought into play will be developed and strengthened so that fusion, adduction and accommodation will take place in harmony and in a co-ordinated manner.

The instrument specified above with respect to pupillary distance, prism diopters and minus lens strength may be used by any person thirty-three years of age or younger because at this age that amount of accommodation is normally available. At the age of thirty-six there is normally an amplitude of accommodation of 5.25 diopters so that the minus sphere or lens 12 will be —5.25. It has been found at the age of 50 that the normal amount of accommodation remaining is 2.50 diopters so that the minus sphere 12 will be —2.50 diopters.

Combination of lens 12 with prism 8 brings about the desired result as set forth in the objects mentioned and it has been found that ocular muscles will be balanced, strengthened and fusion appreciably developed when the method and instrument contemplated by this invention are employed.

While one embodiment of the instrument and one method has been described, it is understood that the scope of the invention is limited only by prior art and the appended claim.

Having thus described the invention, what is claimed as new and desired to be secured by Letters Patent is:

An instrument of the character described for exercising the internal recti and ciliary muscles of the eyes to balance the same and to develope fusion comprising, in combination, a holder; a pair of prisms mounted base out in the holder to act on the internal recti muscles to cause the visual axes of the eyes to converge and meet at an artificially created near point; and a minus spherical lens supported by the holder in juxtaposition with each prism respectively to simultaneously cause the ciliary muscles of the eyes to establish that amount of accommodation necessary to focus upon the said near point, said prisms being formed to give the equivalent of binocular fixation at a predetermined distance from the eyes, said minus lenses being formed to simultaneously co-operate with said prisms to cause the amount of accommodation of the ciliary muscles necessary to focus to the said predetermined near point of binocular fixation established by said prisms.

ROBERT W. SMITH.